UNITED STATES PATENT OFFICE.

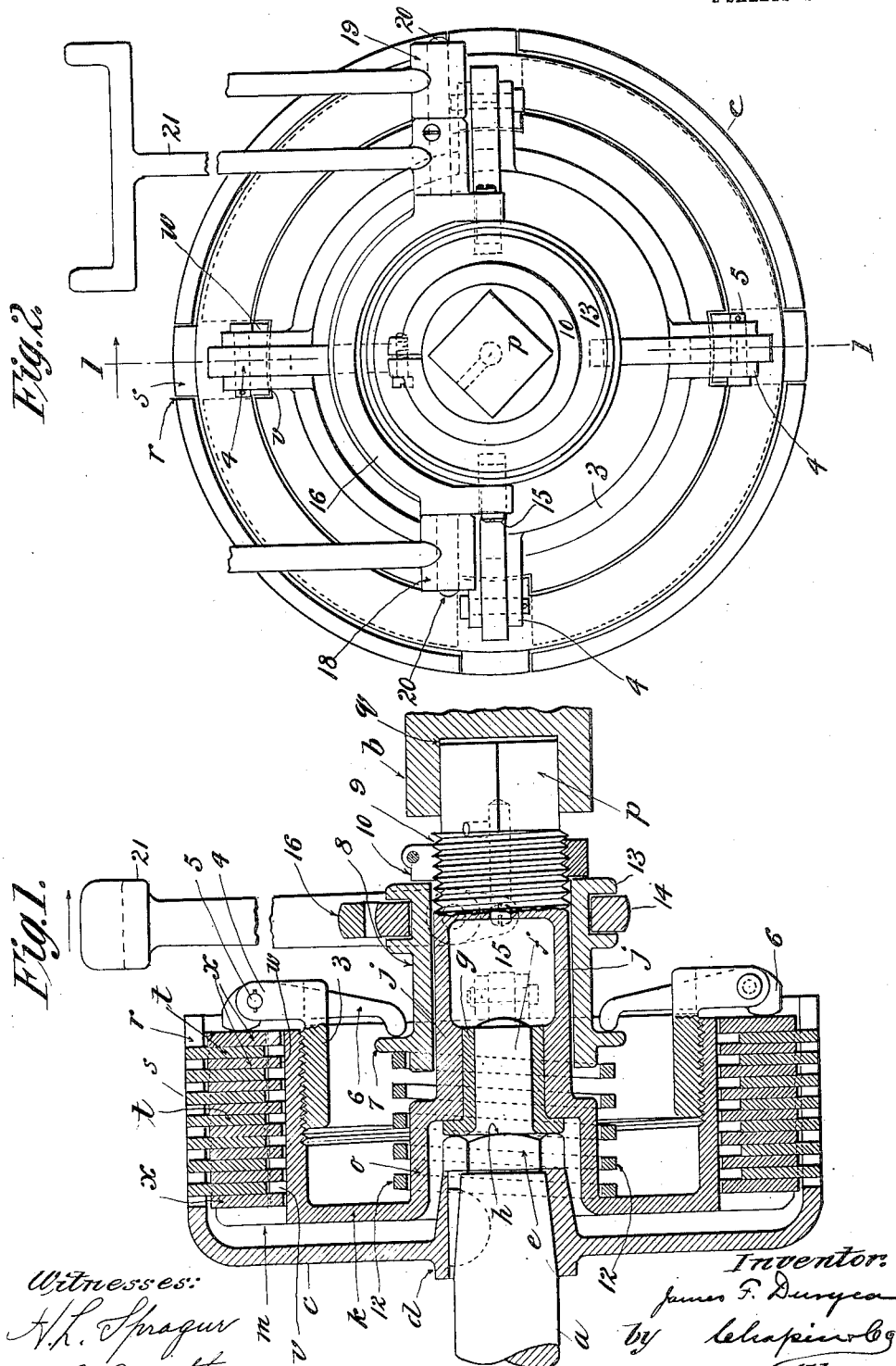

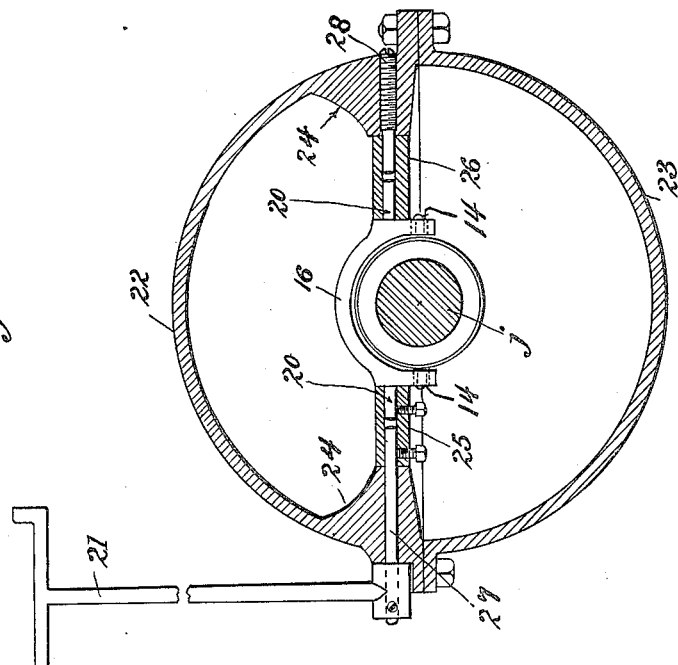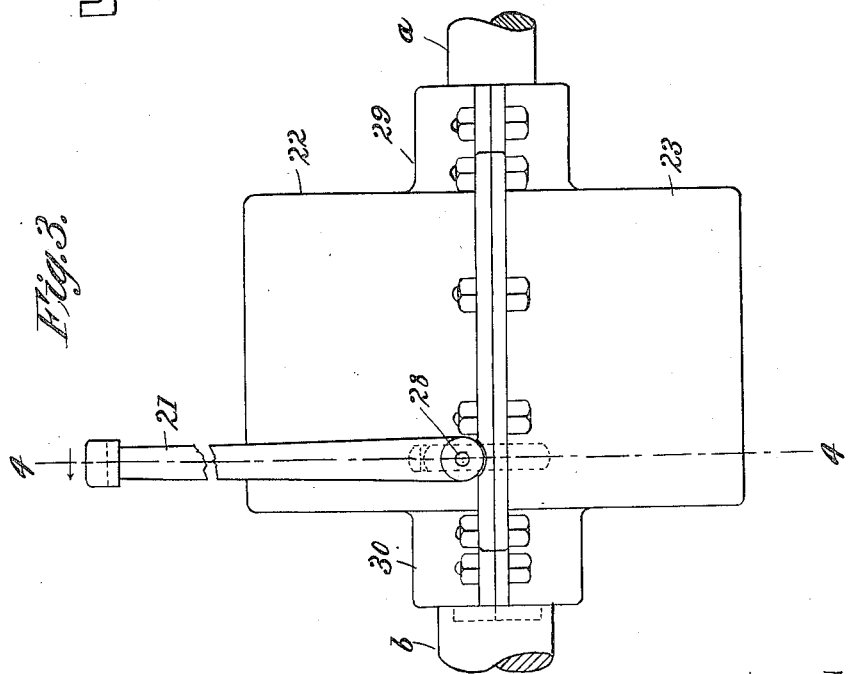

JAMES FRANK DURYEA, OF SPRINGFIELD, MASSACHUSETTS.

FRICTION-CLUTCH.

No. 822,727.　　　Specification of Letters Patent.　　　Patented June 5, 1906.

Application filed December 12, 1904. Serial No. 236,503.

*To all whom it may concern:*

Be it known that I, JAMES FRANK DURYEA, a citizen of the United States of America, residing at Springfield, in the county of Hampden and State of Massachusetts, have invented new and useful Improvements in Friction-Clutches, of which the following is a specification.

This invention relates to friction-clutches, and has special reference to clutches of that type which comprise a series of concentrically-disposed rings on the driving and the driven members of the clutch, the peripheries of which overlap and which are pressed together to provide the requisite frictional contact, the object of the invention being to provide an improved clutch embodying this principle of construction whereby the clutch may occupy as small a space as is consistent with the work it has to perform.

A further object of the invention is to construct the clutch in such manner that it may be readily taken apart for the purpose of adding to or removing the friction-rings or for the inspection of the same, a still further object of the invention being to provide a single adjusting element whereby the maximum degree of the frictional contact between the rings may be regulated.

The clutch which forms the subject-matter of this application is designed especially for use on motor-vehicles, in which it is both desirable and necessary to utilize all of the machinery space to the greatest possible advantage, and this clutch has been designed with special reference to its use on vehicles of this description which are equipped with motors of high power, which not only renders necessary a powerful clutch construction, but which incidently renders it still more necessary to reduce the clutch construction to its most compact form, for the reason that the machinery in high-power vehicles occupies proportionately more of the available machinery space than in low-power vehicles. In this connection it should be stated that there are two types of this kind of clutch, one of which is intended to be run dry and the other of which is designed to run in oil, the clutch forming the subject-matter of this application being of the latter type.

Having these various objects in view, the invention consists in the construction described in the following specification, and clearly pointed out in the claims forming a part thereof, the construction being fully illustrated in the accompanying drawings, in which—

Figure 1 is a sectional elevation of a clutch construction in which this invention is embodied, certain parts being shown in full lines, the plane of the section being on line 1 1, Fig. 2. Fig. 2 is an elevation of the same as viewed from the right-hand side of Fig. 1. Fig. 3 is a side elevation of a casing for the clutch mechanism, the operating-lever extending through the wall thereof. Fig. 4 is a sectional elevation of the same on line 4 4, Fig. 3, this figure, as well as Fig. 4, being on a somewhat reduced scale.

In the drawings, $a$ indicates the end of the crank-shaft of the motor or some like driving-shaft, and $b$ the driven shaft. On the end of this shaft $a$ is a cup-shaped member $c$, provided with a hub $d$, which is keyed on the shaft $a$, the latter at that point where the hub is applied being tapered to receive the interiorly-tapered hub. At the end of this tapered portion of the shaft the latter is turned down to a somewhat smaller diameter, and a nut $e$ is applied thereon to be screwed up against the inner end of the hub $d$, which slightly overhangs the shoulder formed at the end of the tapered portion. Beyond this nut the shaft is turned off to a still smaller diameter, as at $f$, and fitted thereon is a bushing $g$, that end thereof next to the nut $e$ being flanged, as shown clearly in Fig. 1. This bushing bears against the shoulder $h$, which results from the turning down of the portion $f$ of the shaft, and over this bushing is fitted the hub $j$ of a second cup-shaped member $k$, which is nested within the cup member $c$, the closed end of one lying in close proximity to the closed end of the other, the member $k$ being contained entirely within the member $c$.

For the sake of conciseness the member $c$, with its clutch elements, may be designated as the "driving" clutch-head, and the member $k$, with the clutch members that it carries, may be designated as the "driven" clutch-head. The member $k$ is provided with a peripheral flange $m$, which is located in the plane of the closed end thereof and constitutes the abutment against which the compression of the driving and driven clutch elements is effected.

The hub $d$, as stated, has a bearing on the end $f$ of the driving-shaft $a$ and is freely rotatable thereon, that portion of the hub contiguous to the closed end of the member $k$ being enlarged, as at $o$, which permits it to receive the end of the hub $d$ and the nut $e$, thereby providing for the close nesting of the members $k$ and $c$. The outer end of the hub is squared off, as at $p$, and is fitted into a squared socket $q$ in the end of the driven shaft $b$, in which the hub is supported in axial alinement with the driving-shaft, said hub constituting a connection between the latter and the driven shaft.

The peripheral wall of the cup member $c$ is slotted, as at $r$, in parallelism with its axis, the slots extending entirely through the wall and nearly back to the closed end thereof. There are, as shown in Fig. 2, four of these slots equally spaced about the periphery of the cup, their function being to receive the projections $s$ of the friction-rings $t$, these rings being made of metal turned off smooth on each side. In the periphery of the cup member $k$ like grooves $v$ are milled to receive projections $w$ of the friction-rings $x$, which are in all respects like the rings $t$. In the drawings these grooves $v$ are shown as being extended through the flange $m$, and this may or may not be none, as desired, it being merely a mechanical convenience.

The friction-rings $x$ and $t$ are located, respectively, on the exterior of the cup member $k$ and on the interior of the cup member $c$, with their projections $s$ and $w$ in the grooves $r$ and $v$, the rings being disposed alternately, so that each of the rings $t$ lies between two of the rings $x$, both series of rings being movable in the direction of their axes, whereby when pressure is applied to the outside ring they will all be pressed into intimate contact one with the other to provide the desired driving connection between the members $c$ and $k$.

To provide for the compression of the rings, the interior surface of the peripheral wall of the cup member $k$ is screw-threaded to receive a ring 3, about the periphery of which are the ears 4, which extend outwardly therefrom and beyond the ring to a point about opposite the center of the friction-rings. Between these ears on pins 5 are hung the levers 6, the upper ends of which are somewhat rounded and trend inwardly, as shown in Fig. 1, to bear against the outermost of the friction-rings $x$, and the inner ends of these levers, which are radially disposed, lie in close proximity to a flange 7 on a hub 8, which slides on the hub $j$, the latter being screw-threaded, as at 9, to receive the pinch-nut 10, which is adjusted on said hub $j$ to limit the movement in one direction of the hub $h$.

Located between the inner side of the flange 7 and the closed end of the cup-shaped member $k$ is a stiff spiral spring 12, the expansion of which tends to slide the hub 8 toward the nut 10, and thereby swing the short arms of all the levers 6 simultaneously against the outermost of the rings $x$, whereby the compression of the friction-rings is effected and a driving connection established between the shaft $a$ and the shaft $b$ which is proportionate to the frictional resistance of the rings $t$ and $x$.

In the hub 8, preferably in a flange turned in the end thereof, as shown, an annular groove 13 is turned, within which is fitted a loose ring 14, which is provided with trunnions 15, to which the ends of a semicircular fork 16 are connected, which fork is arranged to swing in bearings 18 and 19, which are represented in the drawings merely in a conventional manner, the fork being provided with trunnions 20, located above the end of the fork and extending into the bearings 18 and 19. On one of these trunnions, as shown in Fig. 2, a lever 21 is secured, whereby the fork may be oscillated in its bearings and a sliding movement thereby be communicated to the hub 8 through the groove 13, the function of this lever being to compress the spring 12, and thus take the pressure off the friction-rings $t$ and $x$. If all the pressure on the lever 21 is removed, the expansion of the spring 12 will move the hub 8 toward the pinch-nut 10, and thus compress the rings $t$ of the driving clutch-head between the rings $x$ of the driven clutch-head, the flange $m$ taking all of the thrust of this compression.

By the arrangement of the nested cup members $c$ and $k$, herein described, and the fitting of the rings 3 on the interior wall of the member $k$ and applying the actuating-spring of the cup in the manner described between the bottom of the member $k$ and the flange on the hub 8 the construction is reduced to its most compact form, and yet those parts which might require adjustment are easily accessible—viz., the ring 3 and the pinch-nut 10. The ring 3 may be turned in or out to vary the relation of the levers 3 to the clutch-rings or to the flange 7 by the application thereto of a proper tool, and the pinch-nut 10 may likewise be adjusted and yet the arrangement and disposition of the parts permit the removal of the rings easily and quickly.

The ring 3 may be adjusted to permit the full power of the spring 12 to be applied to the compression of the rings $x$ and $t$, and the pinch-nut 10 may then be adjusted to permit as much or as little of this compression effect to take place, according to the load it is desired that the clutch device shall transmit.

With the clutch adjusted to the load it is to carry it is immaterial how quickly the clutch may be thrown into action, even with the shaft $a$ running at maximum speed, for as the clutch is only equal to the load after the latter has been picked up it will of course slip when the load exceeds this point, and picking up the load gradually as the momentum of the shaft $a$ is overcome the driven shaft will thus start up without a jump, even though the clutch be thrown into action suddenly, as stated.

Figs. 3 and 4 show a casing in side elevation and sectional elevation, respectively, within which the clutch mechanism is inclosed, said casing constituting an oil-reservoir whereby all of the frictional parts of the machine may be thoroughly lubricated, the clutch mechanism running in contact with the oil or partially immersed therein. This casing is preferably made in two parts 22 and 23, bolted together in the plane of the axis of the shafts *a* and *b*, and preferably in the part 22 oppositely-located bosses 23 are cast, which constitute bearings for the trunnions of the fork 16. To permit the easy assembling of the parts, the trunnions 20 of this fork are secured in collars 25 and 26, into which collars the shafts 27 on the one side and 28 on the other extend through the aforesaid bearings, the shaft 28 and one trunnion being secured in the collar 25 by set-screws, whereby the lever 21 may effect the oscillation of the fork 16 to operate the sliding hub 8, as described, the other trunnion turning freely in the collar 26 and the latter turning freely on the end of the shaft 27, which may be secured in its bearings in any suitable manner, as being screwed therein. This specifically-described construction, however, forms no part of the invention, and any other means for mounting the fork in the casing to provide for the easy assembling of the parts may be substituted therefor, if desired.

The clutch-casing is provided with suitable hubs 29 and 30, through which the shafts *a* and *b* extend.

Any suitable device may be provided to lock the lever 21 in a position which will hold the driving and the driven clutch-head out of operative contact one with the other. However, no such means have been shown in the drawings, nor need any be shown, for a notched plate or some similar device may be used for this purpose.

Having thus described my invention, what I claim, and desire to secure by Letters Patent of the United States, is—

1. In a friction-clutch mechanism, a cup-shaped driving clutch-head connected to the driving-shaft, and a similarly-shaped driven clutch-head of smaller diameter nested within it, the closed ends of said head being adjacent one to the other and endwise immovable, there being a flange on one of said heads, a hub on the driven head to be connected to a driven shaft, friction-rings located in the annular space between the heads and alternatively and loosely engaging the latter, a spring contained in said driving-head, and clutch-levers actuated by said spring to press said rings toward said flange; an adjusting device on the hub to limit the expansive movement of said spring, and a device on said hub to effect the compression of said spring.

2. A friction-clutch mechanism comprising a driving-shaft, a cup-shaped driving clutch-head secured on said shaft, the end of the latter extending into said head; a cup-shaped driven clutch-head provided with a long hub, the latter having a bearing on the extended end of the driving-shaft, the driven head having a smaller diameter than the driving-head and being nested within it, said heads being endwise immovable and having their open ends facing in the same direction; friction-rings placed side by side in the annular space between the heads and being alternatively and loosely connected to the walls of the driven and driving heads respectively, the driven head being provided with a flanged abutment for the rings; a hub slidably mounted on the hub of the driven head, clutch-levers pivotally supported to bear by one end against the rings, their opposite ends being located in position to be actuated by the movement of the sliding hub, and a spring located within the driven head, encircling the hub thereof and bearing against said head and against the said sliding hub, adjusting means to limit the movement of the latter in one direction, together with mechanism to move said sliding hub against the tension of the spring.

3. A friction-clutch mechanism comprising cup-shaped driving and driven clutch-heads, connected respectively with the driving and driven shafts, the driven head being of smaller diameter than the driving-head and nested within it and provided with a hub to connect it with the driven shaft; friction-rings alternatively and loosely engaging the interior wall of the driving-head and the exterior wall of the driven head, and disposed in overlapping relation in the annular space between the heads, the driven head being provided with a flange-abutment for the rings; a hub slidably mounted on the hub of the driven head, clutch-levers pivotally supported to bear by one end against the rings, their opposite ends being located in position to be actuated by the movement of said sliding hub; a spring encircling the hub of the driven head to bear against the latter and against said sliding hub, adjusting means to limit the movement of said sliding hub, together with mechanism to move the latter against the tension of said spring.

4. In a friction-clutch mechanism, a cup-shaped driving clutch-head connected to the driving-shaft, and a similarly-shaped driven clutch-head of smaller diameter nested within it, the closed ends of said heads being adjacent one to the other and endwise immovable, there being a flange on one of said heads; a hub on the driven head to be connected to a driven shaft, friction-rings located in the annular space between the heads and alternatively and loosely engaging the latter, a spring contained in said driven head, and clutch-levers actuated by said spring to press said rings toward said flange; an adjusting device on the hub to limit the expansive movement of said spring, and a device on said hub to effect the compression of said spring together with a casing to inclose said clutch mechanism.

5. In a friction-clutch mechanism, a cup-shaped driving clutch-head connected to the driven shaft, and a similarly-shaped driven clutch-head of smaller diameter nested within it, the closed ends of said heads being adjacent one to the other and endwise immovable, there being a flange on one of said heads, a hub on the driven head to be connected to a driven shaft, friction-rings located in the annular space between the heads and alternatively and loosely engaging the latter, a spring contained in said driving-head, and clutch-levers actuated by said spring to press said rings toward said flange; an adjusting device on the hub to limit the expansive movement of said spring, a tight casing within which said clutch mechanism is inclosed, a device on the hub of the driven head to effect the compression of said spring, and means extending through the wall of the casing to actuate said device.

6. In a friction-clutch mechanism, a cup-shaped driving clutch-head connected to the driving-shaft, and a similarly-shaped driven clutch-head of smaller diameter nested within it, the closed ends of said heads being adjacent one to the other and endwise immovable, there being a flange on one of said heads, a hub on the driven head to be connected to a driven shaft, friction-rings located in the annular space between the heads and alternatively and loosely engaging the latter, a ring screwed into the open end of the driven head, and clutch-levers pivotally supported on said ring to bear by one end against said friction-rings, their opposite ends extending radially toward said hub; a spring located within the cup-shaped driven head and encircling the hub of the latter, operatively disposed to bear by one end against said driven head and by the opposite end thereof against said clutch-levers to effect the compression of the friction-rings, together with means on said hub to limit the expansive movement of said spring, and a sliding member on said hub to compress said spring.

7. In a friction-clutch mechanism, a cup-shaped driving clutch-head connected to the driving-shaft, and a similarly-shaped driven clutch-head of smaller diameter nested within it, the closed ends of said heads being adjacent one to the other and endwise immovable, there being a flange on said driven head, a hub on the driven head to be connected by one end to a driven shaft, a bearing for the opposite end of said hub on the driving-shaft, said hub having an oil-chamber therein to lubricate said bearing, there being an opening from said chamber through the wall of the hub; friction-rings located in the annular space between the heads and alternatively and loosely engaging the latter, a second hub slidably mounted on the hub of the driven head, a spring between the driven head and said sliding head, and a nut on the hub of the driven head to limit the expansive movement of said spring; clutch-levers pivotally supported on the driven head and arranged to be actuated by said spring to press the friction-rings together and against the flange on the driven head, and a sliding hub on the hub of the driven head to compress said spring.

JAMES FRANK DURYEA.

Witnesses:
K. I. CLEMONS,
WM. H. CHAPIN.